May 5, 1925.
W. G. L. TOTTEN
FRUIT GATHERER
Filed May 13, 1921
1,536,167
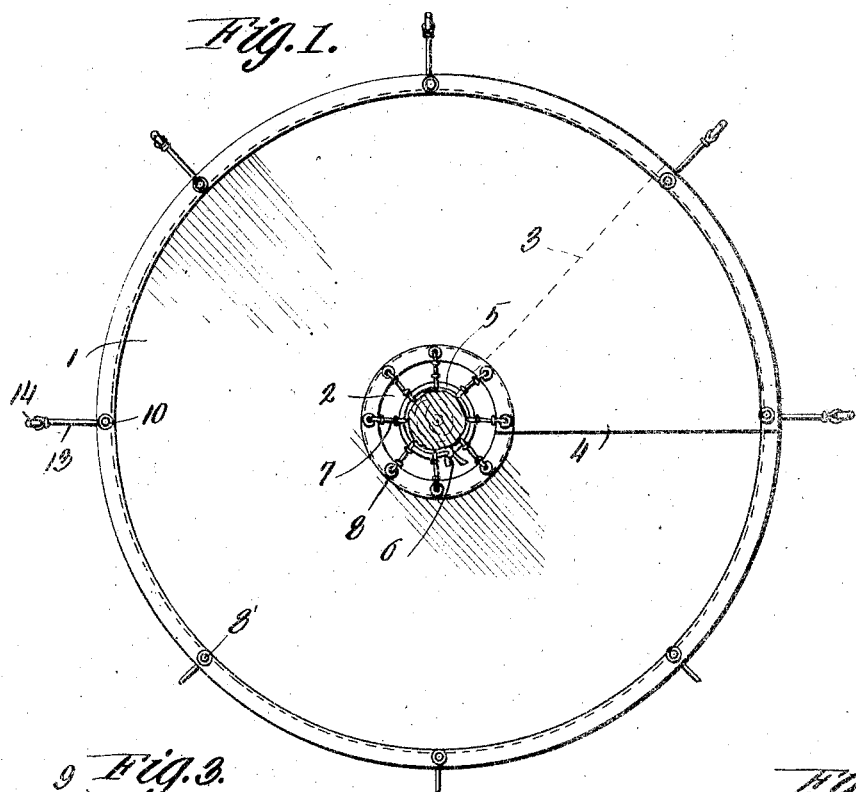
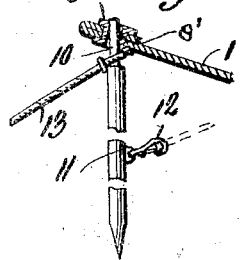
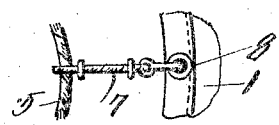
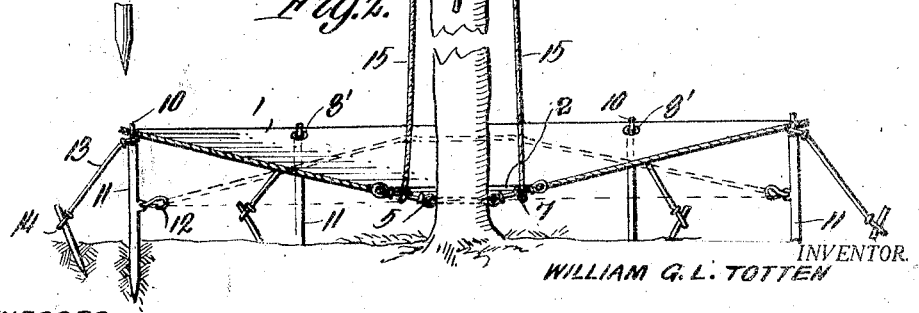
INVENTOR.
WILLIAM G. L. TOTTEN
WITNESSES
BY
ATTORNEY Patented May 5, 1925.

1,536,167

UNITED STATES PATENT OFFICE.

WILLIAM G. L. TOTTEN, OF BUCKHANNON, WEST VIRGINIA.

FRUIT GATHERER.

Application filed May 18, 1921. Serial No. 469,552.

*To all whom it may concern:*

Be it known that I, WILLIAM G. L. TOTTEN, a citizen of the United States, residing at Buckhannon, in the county of Upshur and State of West Virginia, have invented certain new and useful Improvements in Fruit Gatherers, of which the following is a specification.

The invention has relation to fruit gatherers and has for its principal object to provide means for gathering and collecting at the base of a tree, the fruit dropped and knocked therefrom.

An additional object is to provide a circular apron adapted to encircle the trunk of a tree and adjustable vertically of the trunk for deflecting fruit into a heap at at the foot of the tree or outwardly therefrom.

An additional object is to provide new and novel means for gathering fruit from fruit trees and embodying an apron adjustably supported about the trunk of the tree and supported by stakes with which the apron is detachably connected.

With the above and other objects in view the invention may be said to reside generally in the details, of construction, combination and arrangement of parts as will be hereinafter more fully pointed out and described, reference being had to the accompanying drawings, wherein:

Figure 1 is a top plan view illustrating the application of the invention to a tree, the trunk of the latter being shown in section. Figure 2 is a side elevation, the apron being shown in section to illustrate the manner of its support. Figure 3 is a detailed view of the supporting stakes disclosing the method of supporting the apron and guy rope. Figure 4 is a detailed view of the connection between the apron and trunk-engaging loop.

The invention comprises a circular apron 1 of canvas, duck or like material and provided with an opening 2 in the center, the said canvas being made either of pieces connected together to produce the required shape or it may consist of a spiral strip of material having ends 3 and 4 overlapping as shown in Fig. 1. This circular canvas is to be made large enough to receive the fruit falling from the outer branches of any tree to which it is attached and it is adapted to be connected to the trunk of the tree by a loop 5 having tying terminals indicated at 6. This loop is connected to the apron by means of connecting ropes 7 which are looped respectively about the trunk engaging loop 5 and eyelets 8. Connecting ropes 7 are spaced from each other to provide for the passage of fruit therethrough. A second set of eyelets 8' is provided round the rim of the apron and these eyelets are preferably provided with flanges 9 adapted to fit over the pin or shouldered portion 10 of the supporting stakes 11.

Stakes 11 support the canvas at the outer edge as is shown and are adapted to hold the canvas in either of two positions. Each stake is provided with a pointed end in order that it may be easily driven into the ground while the other end is adapted to receive the eyelet of the apron as previously explained. At a suitable point below the shoulder of the stake a hook 12 is provided which is adapted to be engaged with the apron in the second position of the latter. Each stake is braced in position by means of a guy-rope 13 having one end looped over the shoulder of the stake and the other end connected by a pin 14 driven into the ground at a slant and outwardly from the stake. In the first position of the canvas the eyelets 8' are inserted over pins 10 of the stake as is shown in Fig. 2 while loop 5 is loosely encircled about the trunk of the tree near the foot thereof and below the eyelet supported end of the apron in order that the latter may slope inwardly and downwardly towards the central opening 2. Consequently, the fruit falling from the tree and dropping upon the canvas will roll down the slope and drop through the central opening to the ground, collecting in a heap below the canvas and at the foot of the tree. The loop 5 is adjusted longitudinally of the tree trunk by means of lifting elements or ropes 15 having their lower ends connected to certain of the ropes 7 while their upper ends are adapted to be crossed over appropriate branches of the tree, as illustrated in Fig. 2, and connected by suitable tie means 16 which may be a rope encircling the trunk of the tree and engaging the pulling ends of the lifting element 15 as clearly shown in the drawings.

In the second position of the canvas, ropes 15 are drawn upon to elevate the central portion of the canvas; the outer edge of which has, however, previously been detached from the shoulder end of the stake and connected to hook 12. After the ropes 15 have been pulled upon to the desired extent and tied to hold the canvas in position, it will be noted from the dotted line construction of Fig. 2 that the center of the canvas is elevated above the rim and consequently the slope is from the center outwardly and downwardly to the stakes which directs the fruit dropping upon the canvas toward the rim thereof. This is to enable the falling fruit to be shifted outwardly as the pile under the center of the canvas becomes greater with each discharge from the center opening. The canvas, in either position, is drawn to the necessary tautness and distance from the ground by the guy-ropes 13 to save the fruit from bruising as they strike the canvas; the distance between the canvas and the ground in either first or second position of the apron is not sufficient to bruise the fruit falling from the latter. When the canvas is used as a whole, overlapping ends 3 and 4 are positioned as shown at Fig. 1 but it is obvious that only a fractional part of the canvas may be employed if required and this may be done by disengaging the canvas from certain of the stakes, starting with either end 3 or 4. The disengaged or supported ends of the canvas are then gathered in towards the trunk of the tree, leaving only the remaining supported portion of the canvas available for receiving and discharging the fruit being collected.

In attaching the device to a tree, the guy-ropes are first connected to the stakes, after which the eyelets are respectively fitted in place over the ends of the stakes in order that the canvas can be readily lifted off and moved into either first or second position. The change from one position to another can therefore be promptly effected and it is to be noted that in the second position, the apron discharges the fruit to the ground beyond the outer edge of the canvas and clear of the falling fruit previously gathered through the center opening.

The foregoing description and accompanying drawings have reference to what might be considered to be the approved or preferred form of my invention. I desire it to be understood, however, that I may make such changes in the construction, combination and arrangement of parts, materials, dimensions, et cetera, as may prove expedient and fall within the scope of the appended claim.

Having thus described my invention, what I claim as new and desire to secure by Letters Patent is:—

A fruit gatherer of the class described, comprising a flexible apron having an axial opening for receiving the trunk of a tree, the terminals of the apron being disposed in overlapping relation, a lower tree trunk engaging loop, the inner and outer edges of the apron each having an annular row of eyelets associated therewith, tying ropes connecting the inner row of eyelets to the lower tree trunk engaging loop, a plurality of supporting stakes having their upper ends reduced for receiving the outer row of eyelets, said reduced terminals forming shoulders upon which the eyelets are adapted to rest, means for bracing the stakes, an upper tree trunk engaging loop, and supporting ropes connecting the upper tree trunk engaging loop with said tying ropes.

In testimony whereof I affix my signature in presence of two witnesses.

WILLIAM G. L. TOTTEN.

Witnesses:
P. K. LORETZ,
R. B. FOWKES.